US008150932B2

(12) United States Patent
Waris

(10) Patent No.: US 8,150,932 B2
(45) Date of Patent: Apr. 3, 2012

(54) SYSTEM AND METHOD FOR PROVIDING PRIVACY PROTECTED NAVIGATION BETWEEN MOBILE TERMINALS

(75) Inventor: Heikki Waris, Helsinki (FI)

(73) Assignee: Nokia Corporation, Espoo (FI)

( * ) Notice: Subject to any disclaimer, the term of this patent is extended or adjusted under 35 U.S.C. 154(b) by 1835 days.

(21) Appl. No.: 11/173,472

(22) Filed: Jun. 30, 2005

(65) Prior Publication Data

US 2010/0241346 A1 Sep. 23, 2010

(51) Int. Cl.

| | |
|---|---|
| ***G06F 15/16*** | (2006.01) |
| ***G06F 15/173*** | (2006.01) |
| ***H04M 11/04*** | (2006.01) |
| ***H04W 24/00*** | (2009.01) |

(52) U.S. Cl. ..................... 709/207; 709/238; 455/404.2; 455/456.1; 455/456.2; 455/456.3; 455/456.4; 455/456.5; 455/456.6

(58) Field of Classification Search .................. 709/238, 709/207; 455/404.2, 456.1–456.6
See application file for complete search history.

(56) References Cited

U.S. PATENT DOCUMENTS

| | | | | |
|---|---|---|---|---|
| 6,317,682 | B1 * | 11/2001 | Ogura et al. | 701/117 |
| 7,116,977 | B1 * | 10/2006 | Moton et al. | 455/419 |
| 7,167,180 | B1 * | 1/2007 | Shibolet | 345/474 |
| 7,542,882 | B2 * | 6/2009 | Agrawala et al. | 703/2 |
| 8,000,724 | B1 * | 8/2011 | Rayburn et al. | 455/456.3 |
| 2001/0022558 | A1 * | 9/2001 | Karr et al. | 342/450 |
| 2003/0023726 | A1 | 1/2003 | Rice et al. | |
| 2004/0203901 | A1 * | 10/2004 | Wilson et al. | 455/456.1 |
| 2004/0224702 | A1 * | 11/2004 | Chaskar | 455/456.3 |
| 2004/0243941 | A1 * | 12/2004 | Fish | 715/752 |
| 2008/0091728 | A1 * | 4/2008 | Diederiks et al. | 707/104.1 |

* cited by examiner

*Primary Examiner* — Alina N Boutah
*Assistant Examiner* — Clarence John
(74) *Attorney, Agent, or Firm* — Ditthavong Mori & Steiner, P.C.

(57) ABSTRACT

A system of providing location and routing information to a target mobile terminal while still maintaining a specified level of privacy. A target mobile terminal includes a profile having an inaccuracy level contained therein. When a querying terminal desires routing information to the target terminal, a portion of a route to the target terminal is provided, with the portion of the provided route being based upon the level of inaccuracy in the target terminal profile.

25 Claims, 5 Drawing Sheets

SYSTEM AND METHOD FOR PROVIDING PRIVACY PROTECTED NAVIGATION BETWEEN MOBILE TERMINALS

FIELD OF THE INVENTION

The present invention relates generally to positioning technologies such as GPS and cellular positioning. The present invention also relates to navigation technologies for purposes such as route calculation and presentation.

BACKGROUND OF THE INVENTION

Conventional personal navigation systems typically mirror automobile navigation systems but involve the use of a handset. However, traditional personal navigation systems usually rely upon static information that is located within a network server instead of the terminal itself, and navigation information is still accessed from a mass storage location. In such systems, a central server or other device is accessed in order to obtain information such as directions to a specific, static location. In recent years, systems have begun to locally use more dynamic information for various purposes For example, such systems have begun to use traffic congestion information that is received over radio.

One potential extension of this technology involves determining the location of another mobile user. It would be very beneficial to be able to determine another user's location, as well as to obtain directions to the person. However, such a system, if fully implemented, poses major privacy issues. Most individuals would not wish to allow the general public to know their precise location, and many people would prefer to control this information even for people with him they have a personal relationship.

SUMMARY OF THE INVENTION

The present invention provides a privacy-conscious system and method which can be utilized by two users in order to find each other. According to one embodiment of the present invention, a target user transmits accurate location information to a central server, such as a presence server, along with profile information about who is permitted to view that information and with how much accuracy, also referred to herein as granularity. Another user can then choose the target user's ID. This user's terminal queries the location of the target user and a route to the target user. The server then calculates an accurate route to the target user, but does not send full route information to the querying user. Instead, the server uses the target user's granularity for that particular querying user, and only information incorporating this granularity is provided to the querying user. When the users move, their location is updated based upon factors that may include the user's respective movement speed or the difference from the user's previous location, while still taking into account the reduced granularity specified by the target user.

The present invention provides for a number of significant advantages over conventional systems. With the present invention, users do not have to advertise their precise location to the general public, and they can control how specific the advertised location information will be for each potential class of querying user. Additionally, one does not have to request an accurate location of a mobile user for routing purposes when still far away from the user. The present invention also enables the searching for a target user based solely on the user's mobile telephone number, which is typically included in navigation systems. Furthermore, if a user's intention is simply to travel to the location of a target user, then the target user's location does not have to be shown with the present invention.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
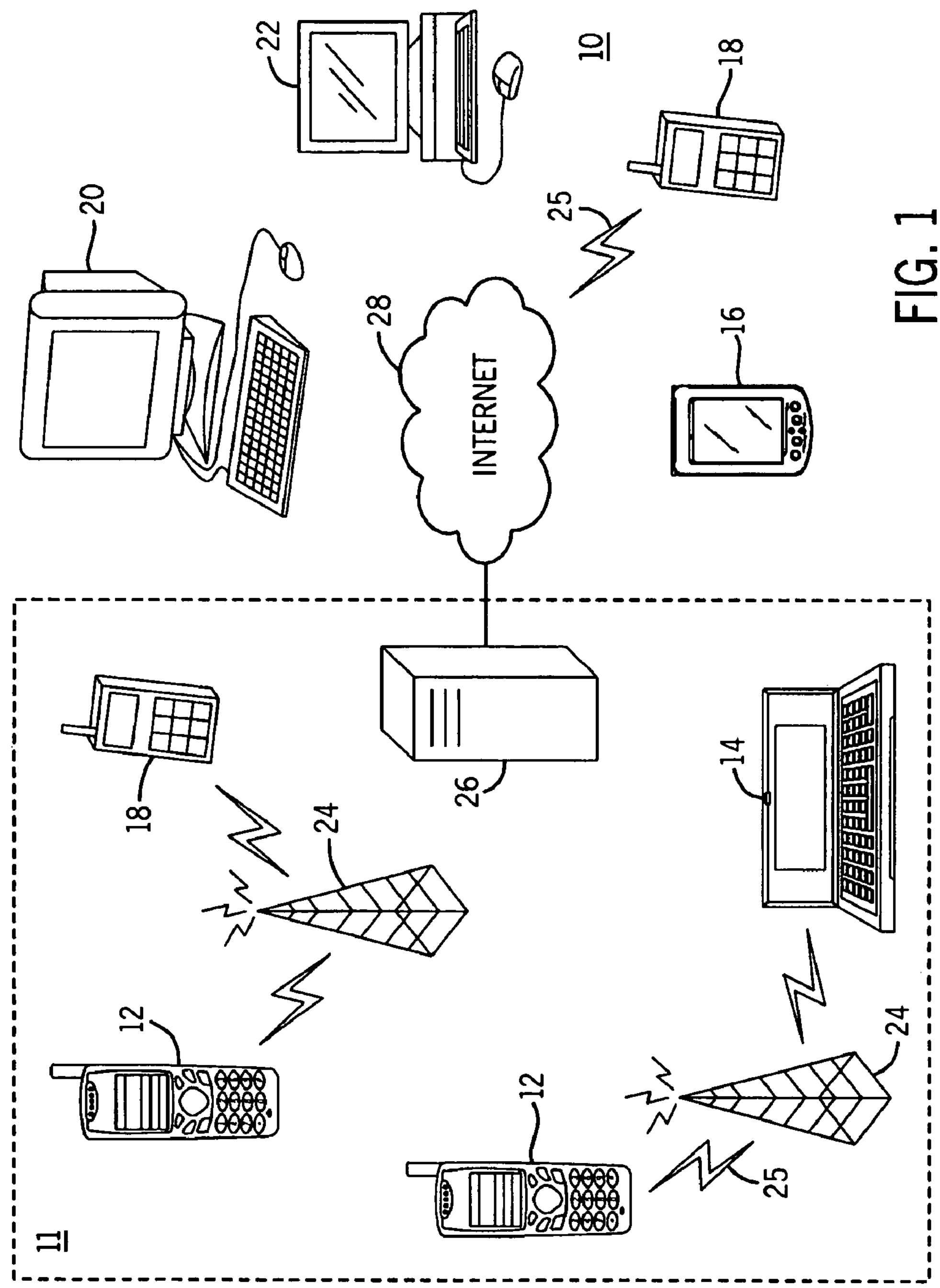
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention provides a privacy-conscious system and method which can be utilized by two users in order to find each other. According to one embodiment of the present invention, a target user transmits accurate location information to a central server, such as a presence server, along with profile information about who is permitted to view that information and with how much accuracy, also referred to as granularity. As used herein, the higher the granularity, the more accurate the location information that is permitted to be provided to the querying user. The granularity can vary by querying user, or it can vary by class of varying user. For example, close family members may be given the highest degree of granularity, while close friends receive a lower level of granularity. The other user or querying user can later choose the target user's ID. This querying user's terminal queries the location of the target user and a route to the target user. The server then calculates an accurate route to the target user, but does not send full route information to the querying user. Instead, the server uses the target user's preferred granularity as the distance from the target user. In other words, the location information is transmitted subject to the reduced granularity level for the specific querying user. When the users move, their location is updated based upon factors that may include the user's respective movement speed or the difference from the user's previous location.

Figure 2:
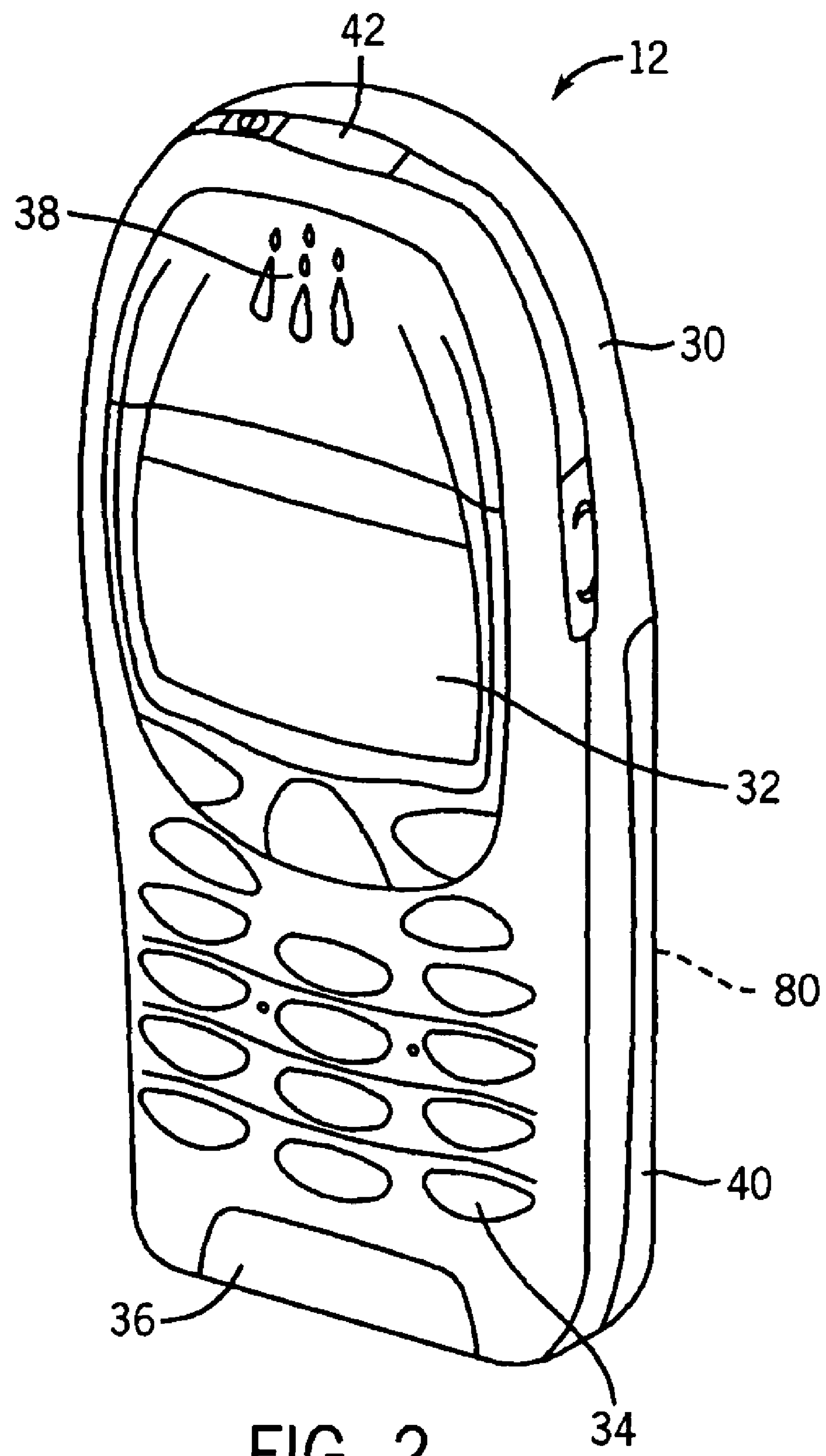
FIG. 2 is a perspective view of a mobile telephone that can be used in the implementation of the present invention.
Figure 3:
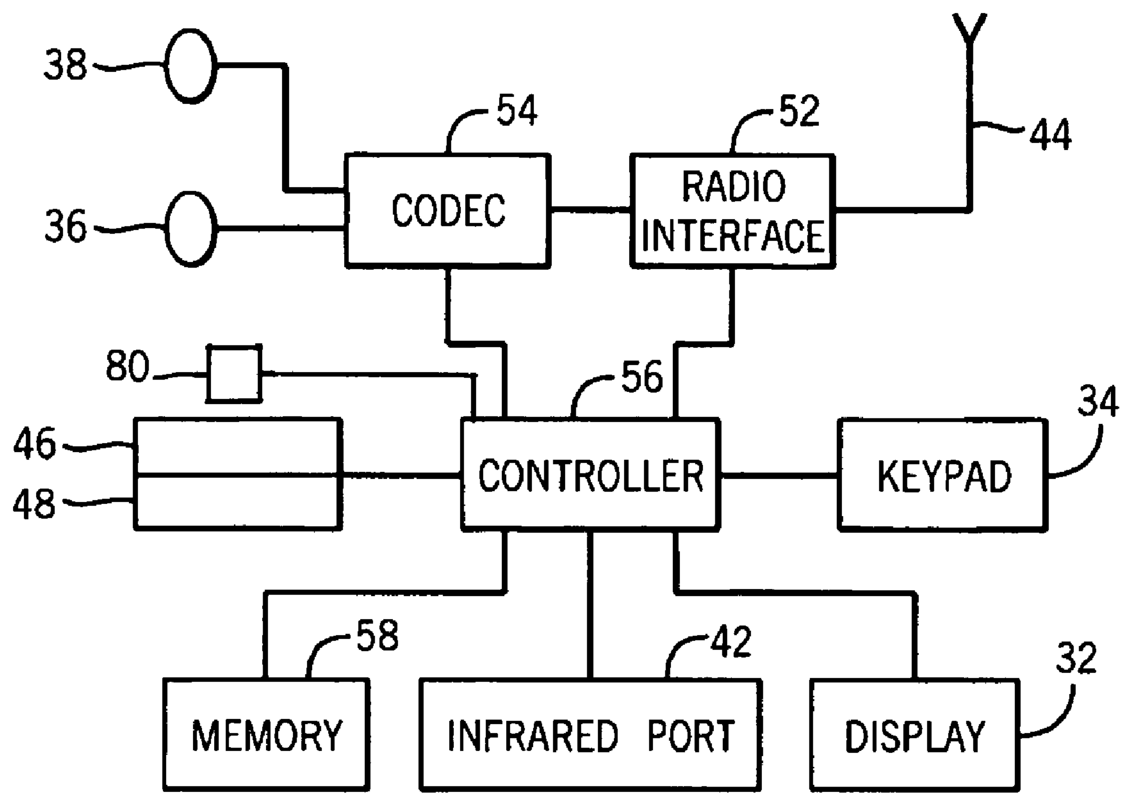
FIG. 3 is a schematic representation of the telephone circuitry of the mobile telephone of FIG. 2.

According to one embodiment of the present invention, a terminal such as the type depicted in FIGS. 2-3 includes positioning sensors 80 and software that automatically collect the terminal's output and resolves it in order to determine the terminal's location. The location information source can comprise, for example, a GPS or cellular positioning system.

Terminal software is used to create a user profile which controls the use of location information for the terminal. This profile can comprise a separate component that is attached to other typical profile information, such as ringing mode or status information (e.g. "in meeting", "driving" or "out of office" indicators). Preferences in the user profile can be used to affect the use of the location information. The user profile can also include special rules for certain users. The user profile defines who can observe the user's location, under which circumstances, when the location information is to be available, and with how much accuracy. The profile information is typically relatively static, but can be changed by users or agent software whenever the preferences or a user's status changes.

In one embodiment of the invention, terminal software is also used for updating the terminal's location in a server. In this particular embodiment, the terminal transmits accurate location information to a selected central server or servers, as stated in the user's profile. When the terminal is not moving, updates to this location information do not need to be transmitted. When the user is moving, the location is updated based upon, for example, the user's movement speed or the difference from the previous location.

A server or plurality of servers are used for storing the locations of the respective users and resolving routes between users. The server function can be integrated into, for example, a Presence server. The server calculates an accurate route between a querying user and a target user. However, the server does not transmit full route information to the querying user. Instead, the server uses the target user's profile to decrease the granularity of the location information or route information in order to preserve the target user's privacy. For example, for one class of querying user, the target user may want to maintain a small zone of privacy. The target user's profile would then include instructions to only provide routing instructions for a certain percentage of the route. In this example, if the querying user and the target user are in different cities, then the querying user may be provided with the city in which the target terminal is located. If the users are in the same city, the querying user may provide information specific as to a square city block. If the users are in the same city block, the information provided may be accurate to only a few meters. For another class of user, a different level of decreased granularity could be specified.

Software within the terminal is used for selecting the users whose location or route should be resolved. The querying user chooses the target user's ID by browsing in sets of hierarchical or topical menus or by directly typing or otherwise inputting a search term. Examples can include search terms commonly used in vehicle navigation such as buildings, landmarks, and street addresses, as well as more individual-specific information such as phone numbers, organizations names, or names from a buddy list. The user's terminal queries the location of and route to the thus-identified user from the server. The search to find the matching user can be performed in the server in one embodiment of the invention, but if the location is indexed under a standardized search term such as a SIP username, it can be resolved locally, e.g., from a telephone number of the terminal.

Terminal software is used for visually or audibly informing a user of the location or route of another user. In a default mode according to one embodiment of the present invention, the querying user observes a map with the highlighted area in which the targeted user is currently located and/or a highlighted route to area. At the same time and in one embodiment of the invention, targeted users can see who is searching them. The targeted user may also be able to observe where the querying user is located and on which route the server is guiding the querying user. This is possible because the server resolves the route instead of the querying terminal.

Figure 4:
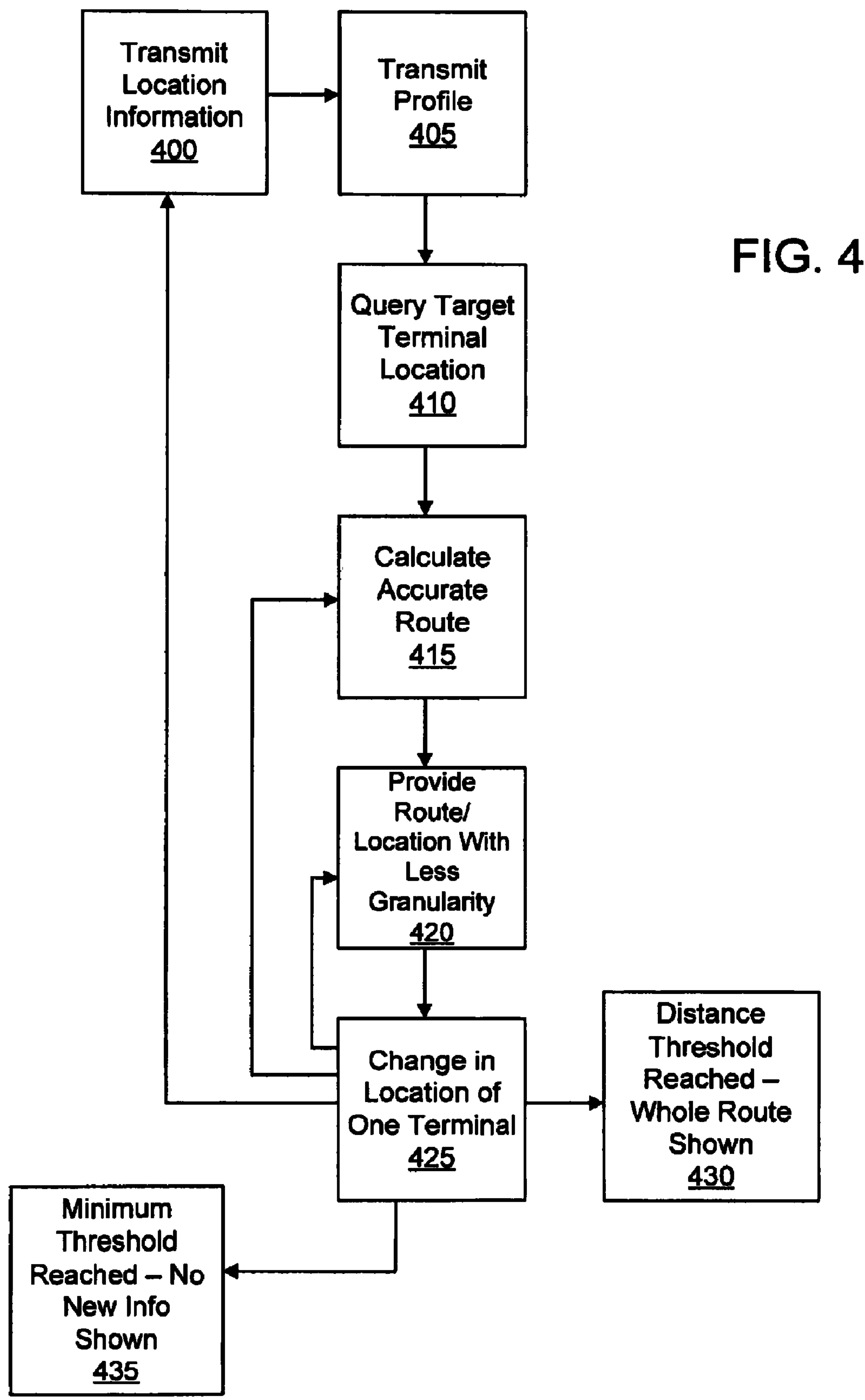
FIG. 4 is a flow chart showing the implementation of various embodiment of the present invention.

FIG. 4 is a flow chart showing the implementation of one embodiment of the present invention. At step 400 in FIG. 4, a target terminal transmits accurate location information to a central server, along with profile information, about who is permitted to view the information and with what level of accuracy. For example, one potential querying terminal may be permitted to receive the information with high granularity (i.e., very precise location information), while another user is only permitted to view the location information with much less granularity. At step 405, a querying terminal selects the target user for route and/or location information. At step 410, the querying terminal queries the location of the target terminal and a route to the target user. At step 415, the server calculates an accurate route to the target user. At step 420, the server uses the target terminal's granularity level in order to provide to the querying terminal with more general location information and/or only a portion of the route from the querying user to the target user based upon the target terminal's profile. At step 425, one of the terminals changes its location, which results in some or all of the being repeated as necessary. Step 425 can be the result of the querying terminal moving along the route towards the target terminal, or it can be the target terminal's location changing. If the target terminal moves, then new location information is provided and a new route may need to be determined; this may not be necessary if only the querying terminal moves. Additionally, the profile of the target terminal may not have to retransmitted if the profile does not change.

In one embodiment of the invention, querying users are also be able to track multiple targets, as well as browsing through maps for each target's location and/or route. The route guidance can also comprise verbal instructions or announcements of the other user's proximity.

The present invention includes a privacy protection feature in the server which can be implemented by using the target user's preferred inaccuracy for a particular querying terminal. The preferred inaccuracy, which is provided in the target user's profile, can comprise the threshold distance from the target user within which the exact route is not shown until the querying user is within a certain distance from the target user. In one embodiment of the present invention, this distance can be relative or dynamic. For example, the visibility threshold can always be one quarter of the physical distance between the querying user and the target user. For example, if a querying user starts at 40 km from a target user, the route to the target user is initially shown for approximately the first 30 km of the route. When the distance decreases, the accuracy improves. When the users are 10 km from each other, the querying user can see the next 7.5 km, and at 2 km the inaccuracy is only 500 m. At some predefined distance, such as 400 m, the exact location is shown. In this particular embodiment, the predefined distance is reached at step 430 in FIG. 4. At this point, the various steps are no longer repeated and the target terminal's location is shown.

In another embodiment of the present invention, a targeted user can also evade discovery by specifying a warning and/or evasion threshold. In this embodiment, when the querying user's view of the targeted user, or the physical location of the querying user, approaches a specified distance from the targeted user, the server can either maintain that distance as an inaccuracy level from the real location, or start increasing the inaccuracy, thereby directing the querying user further away from the targeted user. This can also be controlled with the targeted user's profile. This is represented at step 435 in FIG. 4 when a minimum permitted distance to the target terminal has been achieved by the querying terminal. At this point, the various steps are no longer repeated. This feature can still further be combined with an audio and visual prompt in order to confirm the specific rules for the targeted user whether he or she wants to be found at a particular time and place.

An alternative embodiment of the presenting invention involves the system not including a central server. In this particular embodiment of the present invention, the querying terminal transmits its location information to the targeted user's terminal. The terminal that resolves the route requires a sufficient amount of storage and processing power. In one embodiment, the target terminal can resolve the route because it would have all same information as the server would ordinarily possess. In another embodiment involves the target terminal choosing a suitable location within its preferred inaccuracy threshold, and transmitting this location back to the querying terminal. For example, the target terminal can select a point between the two users. However, the location could also be extrapolated to the other side of the targeted user relative to the querying user. In this way, the route between the users is more likely to be sufficient for navigation purposes.

Figure 5:
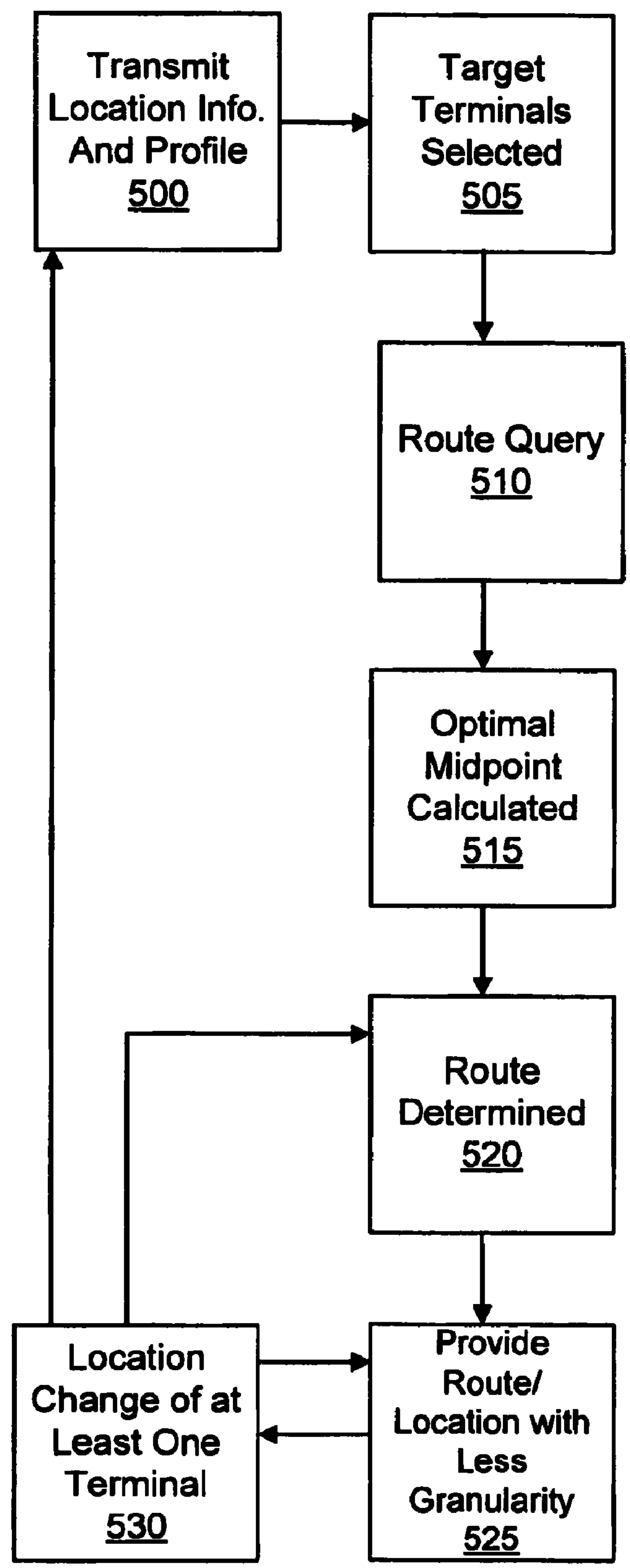
FIG. 5 is a flow chart showing the implementation of an alternative embodiment of the present invention.

In yet another embodiment of the present invention and as depicted in FIG. 5, a route is resolved for a group of targeted users. At step 500 in FIG. 5, a plurality of target terminals transmits accurate location information to a central server, along with profile information about who is permitted to view that information and with how much accuracy. Once again, the granularity level can different for different querying terminals; some querying terminals may not be able to receive any information at all, while others are permitted to receive highly precise location information. At step 505, a querying terminal selects the plurality of target terminals for route and/or location information. At step 510, the querying terminal queries the location of the selected target terminals. At step 515, the server calculates an optimal midpoint between the target terminals. At step 520, the server proceeds to determine a route from the querying terminal to the midpoint. At step 525, the server uses the target terminals' preferred inaccuracy level in order to provide to the querying terminal only a portion of the route from the querying user to the target user. The targeted users could also see the proposed route for the querying user and converge at the appropriate location. Because the movement of the targeted users affects the route and the proposed final location, the proposed location can be iteratively altered with an improved level of accuracy as the targeted users move. At step 530, the querying terminal moves closer to the target optimal midpoint, which results in some or all of the above steps being repeated. Step 530 can also occur when one or more of the target terminals change location. This embodiment can also be combined with the various other embodiment described above.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising: receiving a request for location information for a target mobile terminal which includes a profile having an inaccuracy level from a querying terminal; and decreasing granularity of the location information of the target mobile terminal, the granularity based in part upon a distance between the querying terminal and the target mobile terminal and dependent upon the querying terminal; and determining to make the target mobile terminal's location information with decreased granularity available to the querying terminal.

2. The method of claim 1, wherein the location information comprises at least a portion of a route to the target mobile terminal.

3. The method of claim 1, wherein the granularity of the location information is adjustable by a user of the target mobile terminal.

4. The method of claim 1, further comprising, upon movement of the target mobile terminal, providing updated location information of the target mobile terminal with the decreased granularity.

5. The method of claim 1, wherein the granularity comprises a percentage of the distance between the querying terminal and the target mobile terminal.

6. The method of claim 1, wherein the granularity comprises a threshold distance from the target mobile terminal.

7. A non-transitory computer-readable storage medium carrying one or more sequences of one or more instructions which, when executed by one or more processors, cause an apparatus to perform at least the following steps: receiving a request for location information for a target mobile terminal which includes a profile having an inaccuracy level from a querying terminal; and decreasing the granularity of the location information of the target mobile terminal, the granularity based in part upon a distance between the querying terminal and the target mobile terminal and dependent upon the querying terminal; and determining to make the target mobile terminal's location information with decreased granularity available to the querying terminal.

8. The non-transitory computer-readable storage medium of claim 7, wherein the location information comprises at least a portion of a route to the target mobile terminal.

9. The non-transitory computer-readable storage medium of claim 7, wherein the granularity of the location information is adjustable by a user of the target mobile terminal.

10. The non-transitory computer-readable storage medium of claim 7, wherein the apparatus is caused further to perform: upon movement of the target mobile terminal, providing updated location information of the target mobile terminal with the decreased granularity.

11. The non-transitory computer-readable storage medium of claim 7, wherein the granularity comprises a percentage of the distance between the querying terminal and the target mobile terminal.

12. The non-transitory computer-readable storage medium of claim 7, wherein the granularity comprises a threshold distance from the target mobile terminal.

13. An apparatus, comprising: at least one processor; and at least one memory including computer program code for one or more programs, the at least one memory and the computer program code configured to, with the at least one processor, cause the apparatus to perform at least the following, receiving a request for location information for a target mobile terminal which includes a profile having an inaccuracy level from a querying terminal; decreasing the granularity of the location information of the target mobile terminal, the granularity based in part upon a distance between the querying terminal and the target mobile terminal and dependent upon the querying terminal; and determining to make the target mobile terminal's location information with decreased granularity available to the querying terminal.

14. The apparatus of claim 13, wherein the granularity of the location information is adjustable by a user of the target mobile terminal.

15. The apparatus of claim 13, wherein the apparatus is further caused to: upon movement of the target mobile terminal, determine to provide updated location information of the target mobile terminal with the decreased granularity.

16. The apparatus of claim 13, wherein the granularity comprises a percentage of the distance between the querying terminal and the target mobile terminal.

17. The apparatus of claim 13, wherein the granularity comprises a threshold distance from the target mobile terminal.

18. A method comprising: receiving a request for location information from a querying terminal for a target mobile terminal which includes a profile having an inaccuracy level; and determining to provide the location information of the target device with decreased granularity to a remote device in the response to the request, the decreased granularity being dependent upon a distance between the querying terminal and the target mobile terminal.

19. The method of claim 18, wherein the granularity comprises a threshold distance from the target mobile terminal, or a percentage of the distance between the querying terminal and the target mobile terminal.

20. The method of claim 18, wherein the remote device comprises a server, or a querying device.

21. The method of claim 18, wherein the target mobile terminal is one of a plurality of terminals, and wherein the location information with decreased granularity is based upon a midpoint between the plurality of terminals.

22. An apparatus comprising: at least one processor; and at least one memory including computer program code for one or more programs, the at least one memory and the computer program code configured to, with the at least one processor, cause the apparatus to perform at least the following, receive a request for location information from a querying terminal for a target mobile terminal which includes a profile having an inaccuracy level, and determine to provide the location information of the target device with decreased granularity to a remote device in the response to the request, the decreased granularity being dependent upon a distance between the querying terminal and the target mobile terminal.

23. The apparatus of claim 22, wherein the granularity comprises either a threshold distance from the target mobile terminal, or a percentage of the distance between the querying terminal and the target mobile terminal.

24. The apparatus of claim 22, wherein the remote device comprises either a server or a querying device.

25. The apparatus of claim 22, wherein the target mobile terminal is one of a plurality of terminals, and wherein the location information with decreased granularity is based upon a midpoint between the plurality of terminals.

* * * * *